United States Patent

Nakanishi et al.

[15] 3,664,977

[45] May 23, 1972

[54] BULK POLYMERIZED AROMATIC HYDROCARBON IN RUBBER AND POLYPHENYLENE ETHER

[72] Inventors: Atsuo Nakanishi, Kanagawa-ken; Shinichi Izawa, Tokyo; Mikio Sato, Yokohama, all of Japan

[73] Assignee: Asahi Dow Limited, Tokyo, Japan

[22] Filed: Nov. 17, 1969

[21] Appl. No.: 877,499

[30] Foreign Application Priority Data

Nov. 20, 1968 Japan..................................43/84449

[52] U.S. Cl. ..................260/4 AR, 260/29.6 NR, 260/876 R, 260/878 R, 260/880 R
[51] Int. Cl. .........................................C08c 9/14, C08d 9/08
[58] Field of Search ....................260/4 AR, 892, 4, 880, 876

[56] References Cited

UNITED STATES PATENTS 3,487,127   12/1969   Erchak et al..........................260/876

Primary Examiner—Murray Tillman
Assistant Examiner—J. Seibert
Attorney—Cushman, Darby & Cushman

[57] ABSTRACT

A resin improved in impact resistance is obtained by continuously subjecting to bulk-polymerization a mixture composed mainly of a vinyl aromatic compound and containing a rubbery substance; incorporating a mixture comprising an aromatic hydrocarbon and a polyphenylene ether into the system during a period from the stage immediately after the phase inversion of the rubbery substance to the stage where the total polymer concentration has become 40 percent, and further continuing the bulk-polymerization with thorough stirring until the polymerization is substantially completed.

The thus obtained resin has improved physical properties and gives a molded article excellent in appearance.

5 Claims, No Drawings

BULK POLYMERIZED AROMATIC HYDROCARBON IN RUBBER AND POLYPHENYLENE ETHER

This invention relates to an improved process for preparing modified plastics containing rubbers. More particularly, the invention pertains to an improved method for producing impact resistant resins, characterized in that a starting mixture containing a rubbery substance and a vinyl aromatic compound is continuously subjected to bulk-polymerization; a mixture comprising an aromatic hydrocarbon and a polyphenylene ether represented by the formula:

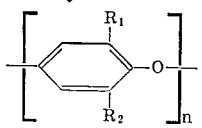

wherein $R_1$ and $R_2$ represent individually an alkyl group having one to four carbon atoms or a halogen atom, and $n$ represents the degree of polymerization, is added to the system during a period from the stage immediately after the phase inversion of the rubbery substance to the stage where the polymer concentration has become 40 percent; and the bulk-polymerization is further continued until the polymerization is substantially completed, thereby improving the physical properties of the polymerization product and the appearance of a molded article obtained therefrom.

It is well known that a mixed resin obtained by blending a polystyrene with a rubbery substance is very different in physical properties from a mixed resin obtained by polymerizing a styrene monomer in the presence of a rubbery substance, due to differences of the two in the bonded state and compatibility between the polystyrene portion and the rubbery substance and in the dispersed state of the rubber component. It is further known that when an improvement in impact strength is desired, the latter, i.e. the resin prepared according to so-called graft-polymerization process, is advantageously. However, it is also well known through experiments that even when said graft polymerization process is adopted, the shape, size and particle size distribution of the dispersed rubber component and the micro structure of rubber particles vary due to more or less differences in polymerization conditions and affect the physical properties, such as tensile strength, flexural strength, impact resistance and elongation of the resulting mixed resin; and the appearance, such as surface gloss, etc., of a molded article obtained therefrom. For the attainment of desired physical properties, by controlling the shape, size and particle size distribution of the dispersed rubber component, therefore, an industrially effective means is to vary, for example, in bulk-polymerization, the polymerization rate, the stirring speed, or the shearing force at stirring.

When an ordinary commercial production plant is used, however, no great variation in the dispersed state of the rubber phase can be expected, because there is a certain limit in mechanical or operational ability of the plant. If the aforesaid procedures are forcibly effected, not only the dispersed state of the rubber but also other factors affecting the physical properties of the resulting resin, e.g. the normal state of the polystyrene used as matrix, become unbalanced to make it impossible to attain the desired object, i.e. improvement in physical properties and appearance. Several examinations have heretofore been made as in regard the phenomenon that a rubber, which is present as solute in styrene at the beginning of the polymerization, is gradually changed in phase with the progress of the polymerization and, at a certain stage, is completely converted to a dispersed phase in the form of particles. However, the course from such phase inversion to the final polymerization product is complex, and it has been quite difficult to properly vary the two phases of the dispersed particulate rubber and the dispersion medium polystyrene. These are fundamentally important factors for said physical properties and appearance.

In view of such circumstances as mentioned above, the present inventors made a wide scope of comparisons and examinations in effectiveness of bulk-polymerization processes, in which operational conditions, such as stirring speed, temperature, conversion and the like, were varied, or other components such as various solvents or polymers were added to the polymerization systems. As the result, we have found that a process, in which a polyphenylene ether, a type of non-crystalline polymer having high transition temperatures (Tg), is added during the polymerization, imparts markedly great effects. The present invention results from the above-mentioned finding. That is, when, in the preparation of a rubber-modified impact resistant polystyrene, a polyphenylene ether is additionally incorporated into the system during a period from the stage immediately after the phase inversion of a rubbery substance to the stage where the polymer concentration has become 40 percent, preferably 15-35 percent, and the incorporation time, amount, concentration and molecular weight of the polyphenylene ether are optionally varied, the resulting polystyrene can be processed, without being changed in tensile strength, impact resistance, flow property, elongation, etc., into a molded article which has been far more improved in gloss, smoothness and the like appearance than is the case with conventional process. What is important is that the present process gives a resin which, unlike a resin according to the conventional process, does not suffer from such unbalance in physical properties that the resin is greatly lowered in impact strength when processed into a molded article improved in gloss or is deteriorated in heat resistance and tensile strength when processed into a molded article improved in smoothness or strength of welded portion. Such a process and its effects can never be derived from conventional knowledge and experience of those skilled in the art. The process of the present invention is an epoch-making process for preparing impact resistant resins.

For example, there was carried out an experiment in which there was prepared a polymer according to the present process by continuously feeding a styrene solution containing 5 percent of polybutadiene to a bulk-polymerization vessel, a styrene solution of poly(2,6-dimethylphenylene-1,4-ether) was added to the system at the stage where the conversion had reached 35 percent, so that the final concentration of the polybutadiene became 4 percent and that of the poly (2,6-dimethylphenylene-1,4-ether) became 15 percent, and then the polymerization was completed. In this case, the impact resistance of the polymer in terms of Izod impact value was about 19 kg.cm/cm and was about 3 times the value of a polymer containing no poly(2,6-dimethylphenylene-1,4-ether). The polymer containing said polyphenylene ether showed great differences from the one containing no polyphenylene ether in surface gloss molded articles when these were molded under the same conditions. This is considered ascribable to the fact that the rubber particles dispersed in the polymer containing polyphenylene ether became smaller. In the above-mentioned case, the diameter of rubber particles dispersed in the resin was about $0.1\mu \sim 0.3\mu$ and was about 1/10 the diameter of rubber particles in a high impact polystyrene resin. According to the conventional process it has been extremely difficult or impossible to attain such a high impact strength with such a small rubber particle diameter. Further, when the same polyphenylene ether is added to a polystyrene containing no rubber, slight improvement in impact strength is observed. Thus, it is clear that in the present process, the polyphenylene ether affects the rubber in the polymer in such a manner as to display a synergistic effect. This is supported by the experiments mentioned below. The aforesaid fact that the dispersed rubber particles have been made extremely fine may be regarded as an example of such synergistic effect. According to the present process there was prepared an impact resistant polystyrene mixed resin containing 20 percent of a polyphenylene ether and 5 percent of rubber. The resin portion of said mixed resin was extracted with toluene and the proportions of polystyrene and polyphenylene ether in the extract were investigated to find that the proportion of the former was 88 percent and that of the latter was 12 percent. For comparison a polyphenylene ether and a rubber-containing polystyrene were blended together to form a mixture having the same composition as mentioned above and the resin portion of the mixture was extracted with toluene. The proportions of polystyrene and polyphenylene ether in the extract were 65 percent and 35 percent, respectively. From this it was clear that according to the present process a considerable amount of polyphenylene ether had been incorporated into the rubber particle portion and had been brought into a non-extractible state. Such a state cannot be attained in the case of a mere blend of a rubber-containing impact resistant polystyrene with a polyphenylene ether.

In a continuous bulk-polymerization process it is a conventional procedure to continuously feed a styrene monomer solution containing a rubber component to a first polymerizer to form a polystyrene at a temperature of 70° – 170° C. At the same time the rubber component, which was initially been present as a continuous phase, is converted to a dispersed phase by employing a suitable stirring means. In this case the stirring facilitated the removal of polymerization heat generated in the system to make uniform the temperature distribution in the direction perpendicular to the polymer flow. The stirring also facilitated the dispersing of the rubber particles by means of shearing force, as mentioned above. After the conversion has reached 25–40 percent, the polymer mixture is sent to a second continuous polymerizer having a different temperature distribution and stirring speed to complete the polymerization.

In practicing the process of the present invention a polyphenylene ether or a mixture containing said ether is fed to the first polymerizer during a period from the stage immediately after the phase inversion of the rubber component to the stage where the polymer concentration becomes 40 percent, i.e. optionally at the latter-half portion of the first polymerizer or at the stage immediately after completion of polymerization in the first polymerizer. If, in this case, the addition time, kind and molecular weight of the polyphenylene ether and the temperature of reaction mixture are suitably selected, it is possible to optionally vary the balance between the physical properties and flow property of the resulting polymer and the gloss and the like appearance of a molded article obtained therefrom. In case the polyphenylene ether is present in the polymerization system from the beginning of polymerization, the behavior of rubber in inversion from the continuous phase to the dispersed phase is entirely different from that observed in the present process and, in view of the shape and internal micro structure of the rubber particles and the physical properties and appearance of the resulting polymer, the above-mentioned case is obviously distinguished from the process of the present invention.

It is impossible to say in regard to the surface gloss, smoothness and the like appearance of a molded article obtained from rubber-modified polystyrene with molding conditions, that any method of quantitative expression has been established, so that a judgement by visual observation is the most accurate. As a surface gloss-measuring equipment, there has been used a glossmeter, which quantitatively expresses the surface gloss in terms of the reflectivity which is the per cent of light of incidence that has been reflected. Although the glossmeter is not high in accuracy, it has been confirmed that a value represented by said reflectivity substantially corresponds to evaluation by visual observation. In each of the examples set forth hereinafter, therefore, the light reflectivity was used to express the surface state.

It is well known that in the injection molding of a thermoplastic resin, in general, the appearance of the resulting molded article becomes better when they are adopted such conditions that the molding cycle time is increased to sufficiently stabilize the molded article. For economical reasons, however, a shorter cycle time is required in molding. Accordingly, the advent of a resin, which, even when subjected to severe molding conditions, can always give a molded article excellent in appearance, has been desired.

In order to show the superiority of the resin obtained according to the present invention by the additional incorporation of a polyphenylene ether, the molding cycle time employed in molding the resin of the present invention was compared with that employed in molding a rubber-containing impact resistant polystyrene obtained under the same polymerization conditions as in the case of the present resin, except that no polyphenylene ether was additionally incorporated. The comparison was effected in such a manner that the two resins were individually molded so that the resulting molded articles were identical in surface state when evaluated in terms of visual observation and light reflectivity, and the mold temperature was lowered to shorten the cooling time. As a result, the molding cycle time required for the present resin was 4/5 to ⅓ the time required for the rubber-modified polystyrene. This value obviously is of extremely great significance from the industrial standpoint.

For the preparation of rubber-modified polystyrenes, a bulk-polymerization process and a bulk-suspension-polymerization process are known, but the former is frequently adopted for economical reasons.

Dutch Pat. Application No. 66–17529, Rexall Drug & Chem. Co., discloses a process for preparing a mixed resin by subjecting styrene to polymerization in the presence of rubber, adding a polyphenylene ether to the polymerization system during said polymerization, immediately thereafter converting the system to a suspension system and then effecting suspension polymerization to complete it. According to a bulk-suspension-polymerization process there is slight agitation in the suspended particles formed in the latter-half stage of the polymerization, i.e., in the suspension-polymerization stage, and it is extremely difficult to finely divide the rubber particles dispersed in the suspended particles.

In the present invention, only bulk-polymerization is effected from the beginning to the end of the process, and hence the effect obtained is that a strong shearing force acts continuously on the dispersed rubber particles to make the rubber particle diameter extremely small (about 0.1 – 0.3 $\mu$), so that the resulting resin can give a molded article excellent in appearance.

As the rubbery substances to be added to the polymerization system in the present invention, there may be used natural rubber, synthetic rubbers derived from conjugated dienes, and other synthetic substances showing rubber-like behaviors. These include, for example, natural crepe rubber, butadiene-styrene copolymer rubber, butadiene-acrylonitrile copolymer rubber, polybutadiene rubber, polyisoprene rubber and ethylene-propylene rubber.

Examples of the vinyl aromatic compound referred to in the present invention include styrene, vinyltoluene, vinylxylene, ethylvinylbenzene, isopropenylbenzene, isopropylstyrene and ethylvinyltoluene. In addition to these, there may be contained as copolymerization components other copolymerizable vinyl compounds.

Examples of the polyphenylene ethers employed in the present invention, which are incorporated into the polymerization system and show marked action for the improvement in properties of the resulting resin, include poly(2,6-dimethylphenylene-1,4-ether), poly(2,6-diethylphenylene-1,4-ether), poly(2,6-dichlorophenylene-1,4-ether), poly(2,6-dibromophenylene-1,4-ether), poly(2-methyl-6-ethylphenylene-1,4-ether), poly(2-chloro-6-methylphenylene-1,4-ether), poly(2-methyl-6-isopropylphenylene-1,4-ether), poly(2,6-di-n-propylphenylene-1,4-ether), poly(2-bromo-6-methylphenylene-1,4-ether), poly(2-chloro-6-bromophenylene-1,4-ether) and poly(2-chloro-6-ethylphenylene-1,4-ether).

In the present invention, the mixture containing aromatic hydrocarbon compound and polyphenylene ether which is added after the first polymerization may be incorporated with an organic peroxide or an organic hydroperoxide. In this case, there are attained such advantages that there is promoted the mutual reaction of rubbery substance with the residual vinyl aromatic compound and the polymerization rate is increased, and greater influence can be brought about on the physical properties of the resulting resin.

In practicing the present process, a pre-polymerizer may be attached to the first polymerizer; the first and second polymerizers may further be subdivided into several reaction zones; or a chain transfer agent and other suitable modifiers and a solvent may be added at an optional stage during the polymerization. All these procedures are also involved in the technical scope of the present invention.

The impact resistant polymer compositions obtained according to the process of the present invention have such advantage over the conventional rubber-modified styrene type impact resistant resins that molded articles obtained therefrom can be greatly improved in surface gloss, smoothness and the like appearance without sacrificing the processability, tensile strength, impact resistance and heat resistance of the compositions. The process of the present invention gives resin compositions capable of producing an extremely wide scope of useful products.

The present invention is illustrated in further detail below with reference to examples, in which all the parts are by weight.

EXAMPLE 1

A homogeneous mixture comprising 80 parts of styrene monomer, 8 parts of styrene-butadiene rubber, 2 parts of mineral oil and 10 parts of ethylbenzene was continuously fed to a first polymerizer under stirring at 30 r.p.m. to effect bulk-polymerization. The polymerization proceeded while controlling the temperature and the feed rate so that the total solid content of the mixture became 25 percent at the exit of the first polymerizer. The mixture from the first polymerizer was mixed with a homogeneous mixture comprising 20 parts of styrene monomer, 10 parts of ethylbenzene and 10 parts of poly(2,6-dimethylphenylene-1,4-ether) and was introduced into a second polymerizer to effect polymerization, and the polymerization was substantially completed at the exit of the second polymerizer. The feed rate of the additionally incorporated mixture was so controlled as to become 4/10 the feed rate of the mixture introduced into the first polymerizer. The resulting resin had a rubber content of 6.5 percent, a polyphenylene ether content of 8.1 percent, a tensile strength of 440 kg/cm² and an Izod impact strength of 15.6 kg.cm/cm. Further, the heat distortion temperature of the resin was 114° C., which is about 10° C. higher than in the case of an impact resistant resin containing no polyphenylene ether. According to microscopic observation, the dispersed rubber particle diameter in the above case was 0.2 – 0.3 μ. The resin obtained in the example and a rubber-containing polystyrene obtained under the same conditions as in this example, except that no poly(2,6-dimethylphenylene-1,4-ether) was additionally incorporated, where individually subjected to injection molding at a screw temperature of 200° – 230° C. and a mold temperature of 40° – 50° C. so that the surface gloss of each molded article became 80 percent in terms of light reflectivity, and the times of individual molding cycles were measured. As the result, the time of the molding cycle of the resin incorporated with the polyphenylene ether was in the range of 20–30 seconds and that of the resin containing no polyphenylene ether was in the range of 40–50 seconds.

EXAMPLE 2

A homogeneous mixture comprising 78 parts of styrene monomer, 10 parts of polybutadiene, 2 parts of mineral oil and 10 parts of ethylbenzene was continuously fed to a first polymerizer under stirring at 30 r.p.m. to effect bulk-polymerization. The polymerization proceeded while controlling the temperature and the feed rate so that the total solid content of the mixture became 25 percent at the exit of the first polymerizer. The mixture from the first polymerizer was thoroughly mixed with a homogeneous mixture comprising 30 parts of ethylbenzene and 30 parts of poly(2,6-dimethylphenylene-1,4-ether) and was introduced into a second polymerizer to effect polymerization. The polymerization was substantially completed in the second polymerizer, and the resulting resin was taken out. The feed rate of the mixture additionally incorporated at the intermediary stage was so controlled as to become 6/10 the feed rate of the mixture introduced into the first polymerizer. The thus obtained resin has a tensile strength of 540 kg/cm², an Izod impact strength of 25.5 kg.cm/cm and a heat distortion temperature of 130° C. The resin obtained in this example and a rubber-containing polystyrene obtained under the same conditions as in this example, except that no poly(2,6-dimethylphenylene-1,4-ether) was additionally incorporated, were individually subjected to injection molding at a screw temperature of 220° – 240° C. and a mold temperature of 70° – 75° C. so that the surface gloss of each molded article became 80 percent in terms of light reflectivity, and the times of individual molding cycles were measured. As the result, the time of the molding cycle of the resin incorporated with the polyphenylene ether was in the range of 18–20 seconds and that of the resin incorporated with no polyphenylene ether was in the range of 30–35 seconds.

EXAMPLE 3

A homogeneous mixture comprising 83 parts of styrene monomer, 5 parts of styrene-butadiene copolymer rubber, 2 parts of mineral oil and 10 parts of ethylbenzene was continuously fed to a first polymerizer under stirring at 30 r.p.m. to effect bulk-polymerization. At the middle stage of polymerization in the first polymerizer where the total solid concentration of the mixture had become 15 percent, a mixture comprising 25 parts of styrene monomer, 10 parts of ethylbenzene and 5 parts of poly(2,6-dimethylphenylene-1,4-ether) was additionally incorporated into the first polymerizer, and the temperature and the feed rate were controlled so that the total solid content became 30 percent at the exit of the first polymerizer. Subsequently, the mixture was directly fed to a second polymerizer under stirring at a speed of 7 r.p.m. to complete the polymerization, and the resulting resin was taken out. The feed rate of the additionally incorporated mixture containing the polyphenylene ether was so controlled as to become 6/10 the feed rate of the starting mixture introduced into the first polymerizer. The thus obtained resin had a rubber content of 4.1 percent, a polyphenylene ether content of 4.0 percent, a tensile strength of 420 kg/cm² and an Izod impact strength of 11.2 kg.cm/cm. According to microscopic observation, the average particle diameter of the dispersed rubber in the above case was 0.2μ. The resin obtained in this example and a rubber-containing polystyrene obtained under the same conditions as in this example, except that no poly(2,6-dimethylphenylene-1,4-ether) was additionally incorporated, were individually subjected to injection molding at a screw temperature of 190° – 220° C. and a mold temperature of 50° – 60° C. so that the surface gloss of each molded article became 85 percent in terms of light reflectivity, and the times of individual molding cycles were measured. As the result, the time of the molding cycle of the resin incorporated with the polyphenylene ether was in the range of 30–35 seconds and that of the resin incorporated with no polyphenylene ether was in the range of 40–50 seconds.

EXAMPLE 4

Example 1 was repeated, except that a mixture of 85 parts of styrene monomer, 3 parts of polybutadiene, 2 parts of mineral oil and 10 parts of ethylbenzene was used as the starting mixture to be charged into the first polymerizer. The resulting resin has a rubber content of 2.2 percent and a polyphenylene ether content of 7.9 percent, and had a tensile strength of 390 kg./cm² and an Izod impact strength of 9.5 kg.cm/cm. The resin obtained in this example and a rubber-containing polystyrene obtained under the same conditions as in this example, except that no poly(2,6-dimethylphenylene- 1,4-ether) was additionally incorporated, were individually subjected to injection molding at a screw temperature of 200° – 230° C. and a mold temperature of 60° – 70° C. so that the surface gloss of each molded article became 90 percent in terms of light reflectivity, and the times of individual molding cycles were measured. As the result, the time of the molding cycle of the resin incorporated with the polyphenylene ether was in the range of 20–25 seconds and that of the resin incorporated with no polyphenylene ether was in the range of 35–40 seconds.

EXAMPLE 5

Example 3 was repeated, except that the additionally incorporated mixture containing the polyphenylene ether had been charged with 0.05 part of benzoyl peroxide. The resulting resin was identical in composition with that obtained in Example 3, but came to have a tensile strength of 485 kg./cm² and an Izod impact strength of 8.5 kg.cm/cm. The resin obtained in this example and a rubber-containing polystyrene obtained under entirely the same conditions as in this example, except that no poly(2,6-dimethylphenylene-1,4-ether) was additionally incorporated, were individually subjected to injection molding at a screw temperature of 190° – 220° C. and a mold temperature of 50° – 60° C. so that the surface gloss of each molded article became 85 percent in terms of light reflectivity, and the time of individual molding cycles was measured. As the result, the time of the molding cycle of the resin incorporated with the polyphenylene ether was in the range of 25–30 seconds and that of the resin incorporated with no polyphenylene ether was in the range of 40–45 seconds.

What is claimed is:

1. In a process for producing an impact resistant resin, which comprises dissolving a rubbery material in a mixture composed mainly of a vinyl aromatic compound and subjecting the resulting solution to thermal polymerization in the presence of a polyphenylene ether, the improvement which comprises heating a mixture solution containing 3.0 to 10 parts by weight of a rubbery material selected from the group consisting of natural crepe rubber, butadiene-styrene copolymer rubber, butadiene-acrylonitrile copolymer rubber, polyisoprene rubber, polybutadiene rubber and ethylene-propylene rubber and 78 to 85 parts by weight of a vinyl aromatic compound at a temperature of 70°–170° C. to bulk-polymerize the mixture, adding to the polymerization mixture a polyphenylene ether represented by the formula:

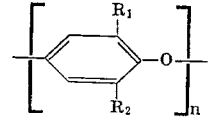

wherein $R_1$ and $R_2$ are alkyl of one to four carbon atoms or halogen and n is the degree of polymerization, in a proportion of 4.0 to 20 percent by weight based on the total weight of the final polymer at a time of from the stage immediately after the formation of a dispersoid of the rubbery material to the stage at which the total polymer concentration reaches 40 percent by weight, and continuing the bulk-polymerization of the resulting mixture with a sufficient stirring at a temperature of 70°–170° C. to complete the polymerization.

2. A process according to claim 1, wherein the vinyl aromatic compound is selected from the group consisting of styrene, vinyltoluene, vinylxylene, ethylvinylbenzene, isopropenylbenzene, isopropylstyrene and ethylvinyltoluene.

3. A process according to claim 1, wherein the polyphenylene ether is poly(2,6-dimethylphenylene-1,4-ether).

4. A process according to claim 1, wherein the aromatic hydrocarbon is styrene or ethylbenzene.

5. A process according to claim 1, wherein the solution of the polyphenylene ether is incorporated into the system at the stage where the total polymer concentration has become 15–35 percent.

* * * * *